(12) United States Patent  
Papakipos et al.

(10) Patent No.: US 8,904,013 B2  
(45) Date of Patent: Dec. 2, 2014

(54) SOCIAL HOTSPOT

(75) Inventors: Matthew Nicholas Papakipos, Palo Alto, CA (US); Michael John McKenzie Toksvig, Palo Alto, CA (US); David Harry Garcia, Sunnyvale, CA (US); Mohit Talwar, Palo Alto, CA (US); Eglia Nair Flores, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 311 days.

(21) Appl. No.: 13/359,404

(22) Filed: Jan. 26, 2012

(65) Prior Publication Data

US 2013/0198274 A1 Aug. 1, 2013

(51) Int. Cl.
  G06F 15/16 (2006.01)
  H04L 12/58 (2006.01)
  H04W 76/02 (2009.01)

(52) U.S. Cl.
  CPC ............ H04L 51/32 (2013.01); H04W 76/021 (2013.01)
  USPC ......................................... 709/227; 709/250

(58) Field of Classification Search
  CPC ....... H04L 51/32; H04L 51/38; H04W 4/008; H04W 76/021; H04M 15/8038
  USPC ................................. 709/227, 250
  See application file for complete search history.

(56) References Cited

U.S. PATENT DOCUMENTS

| 7,263,076 | B1 | 8/2007 | Leibovitz | |
|---|---|---|---|---|
| 8,302,164 | B2 | 10/2012 | Lunt | |
| 2006/0075506 | A1* | 4/2006 | Sanda et al. | 726/26 |
| 2008/0151847 | A1* | 6/2008 | Abujbara | 370/338 |
| 2010/0037288 | A1 | 2/2010 | Carraher | |
| 2011/0055335 | A1 | 3/2011 | Reilly | |
| 2012/0084430 | A1* | 4/2012 | Lu | 709/224 |
| 2012/0110640 | A1* | 5/2012 | Donelson et al. | 726/3 |
| 2012/0303823 | A1* | 11/2012 | Nair et al. | 709/227 |
| 2013/0067081 | A1* | 3/2013 | Liu et al. | 709/225 |

FOREIGN PATENT DOCUMENTS

WO 2011/006231 A1 1/2011

OTHER PUBLICATIONS

International Search Report and Written Opinion for International Application PCT/US2013/022836, May 9, 2013.

* cited by examiner

*Primary Examiner* — Larry Donaghue  
(74) *Attorney, Agent, or Firm* — Baker Botts L.L.P.

(57) ABSTRACT

In one embodiment, a method includes broadcasting, from a first mobile device, a message having an identity of the first mobile device and conditions for connecting to a network through the first mobile device and receiving, at the first mobile device, a request from one or more second mobile devices that includes second user identifiers corresponding to respective second users of the one or more second mobile devices. The second user identifiers correspond to respective user accounts of one or more second users in a social-networking system. The method also includes determining, at the first mobile device, whether the one or more second mobile devices are authorized to access the network through the first mobile device and, if the one or more second devices are authorized to access the network, then configuring the first mobile device to provide the second mobile device network access.

28 Claims, 4 Drawing Sheets

SOCIAL HOTSPOT

TECHNICAL FIELD

This disclosure generally relates to social-networking systems, and more specifically relates to mobile access portals that incorporate social network elements.

BACKGROUND

A social network, in general, is a social structure made up of entities, such as individuals or organizations that are connected by one or more types of interdependency or relationships, such as friendship, kinship, common interest, financial exchange, dislike, or relationships of beliefs, knowledge, or prestige. There are social-networking systems existing on the Internet in the form of social-networking websites. A social-networking system, such as a social-networking website, enables its users to interact with it and with each other through the system.

The social-networking system may create and store a record, often referred to as a user profile, in connection with the user. The user profile may include a user's demographic information, communication channel information, and personal interests. The social-networking system may also create and store a record of a user's relationship with other users in the social-networking system (e.g., social graph), as well as provide services (e.g., wall-posts, photo-sharing, or instant messaging) to facilitate social interaction between users in the social-networking system. The social-networking system may also create and store user preferences.

The advent of social-networking, instant messaging, and ubiquitous wireless data networks allows individuals to select from a plurality of methods to communicate with their contacts. In the past, communications between individuals were limited to physical mail, wired telephones, fax, and wireless telephones. However, with the expansion of the Internet, coupled with mobile devices capable of maintaining a data connection to the Internet, users may select from a plethora of communications means, such as: cellular phone calls, e-mail to multiple accounts, multiple instant messaging protocols, twitter messages, voice-over-IP (VoIP) calls, video chats, SMS and MMS messages, social-networking messages, voicemail, push-to-talk (PTT), and dedicated notification-based message clients such as the Blackberry Messenger and Kik Messenger.

Wireless communications used in carrier-grade networks usually consist of a cell-based infrastructure where all mobile device nodes must communicate directly with a network base station. Alternatively, mobile device nodes may act as wireless access points for other mobile devices. Current wireless developments seek to improve Quality of Service so that carrier-grade service may be attained in a heterogeneous wireless environment.

DESCRIPTION OF EXAMPLE EMBODIMENTS

Figure 1:
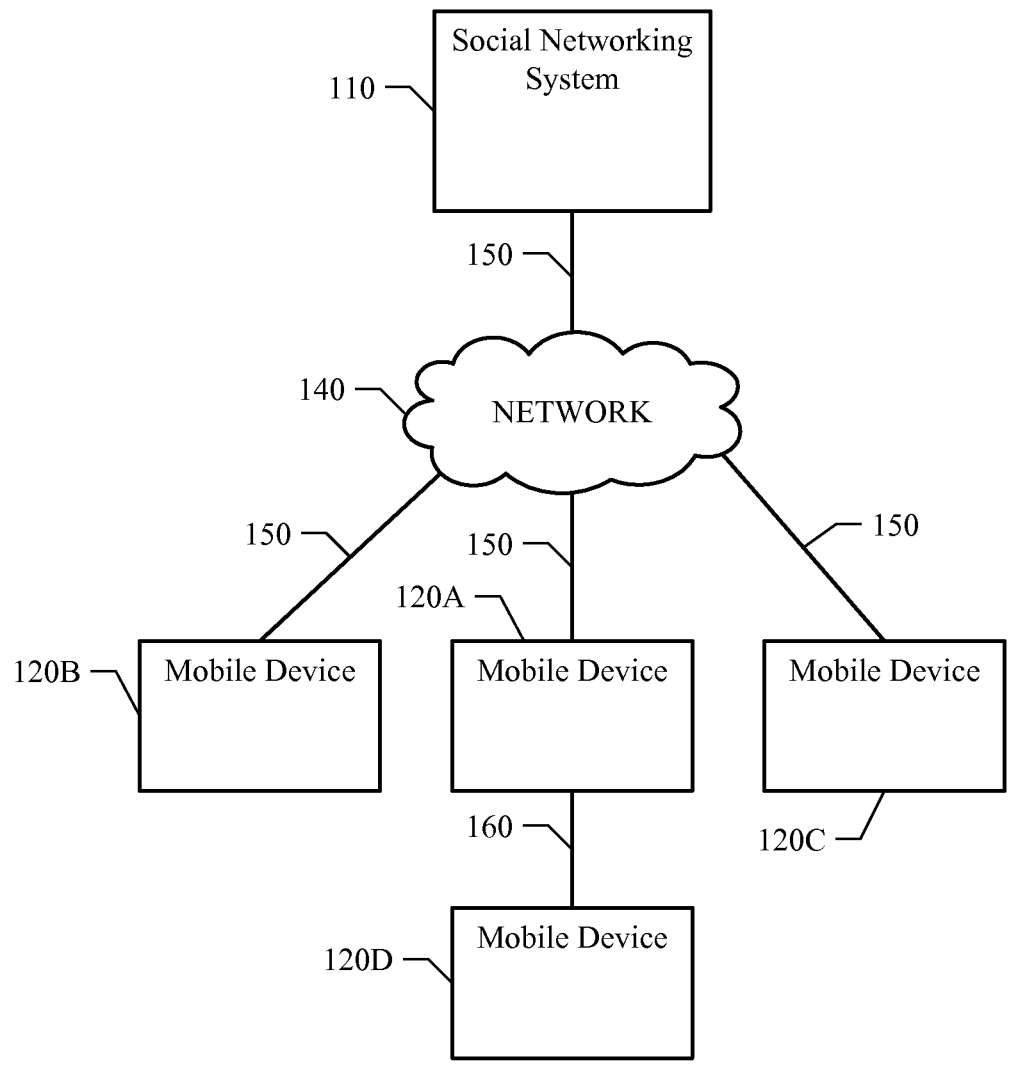
FIG. 1 illustrates an example system.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social network, in general, is a social structure made up of entities, such as individuals or organizations that are connected by one or more types of interdependency or relationships, such as friendship, kinship, common interest, financial exchange, dislike, or relationships of beliefs, knowledge, or prestige. There are social-networking systems existing on the Internet in the form of social-networking websites. A social-networking system, such as a social-networking website, enables its users to interact with it and with each other through the system.

The social-networking system may create and store a record, often referred to as a user profile, in connection with the user. The user profile may include a user's demographic information, communication channel information, and personal interests. The social-networking system may also create and store a record of a user's relationship with other users in the social-networking system (e.g., social graph), as well as provide services (e.g., wall-posts, photo-sharing, or instant messaging) to facilitate social interaction between users in the social-networking system. The social-networking system may also create and store user preferences.

A social-networking system, such as a social-networking website, enables its users to interact with it, and with each other, through the system. Typically, to become a registered user of a social-networking system, an entity, either human or non-human, registers for an account with the social-networking system. Thereafter, the registered user may login to the social-networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social-networking system, the social-networking system may create and store a record, often referred to as a "user profile," in connection with the user. The user profile or account may be associated with a user identifier associated with the user. The user profile may include information provided by the user and information gathered by various systems, including the social-networking system, relating to activities or actions of the user. For example, the user may provide his name, profile picture, contact information, birth date, gender, marital status, family status, employment, education background, preferences, interests, and other demographical information to be included in his user profile. The user may identify other users of the social-networking system that the user considers to be his friends. A list of the user's friends or first degree contacts may be included in the user's profile. Connections in social-networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social-networking system allow the connection to be indirect via one or more levels of connections (e.g., friends of friends). Connections may be added explicitly by a user, for example, the user selecting a particular other user to be a friend, or automatically created by the social-networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social-networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

FIG. 1 illustrates an example system whereby mobile devices 120A, 120B, 120C interact with the social-networking system 110 through a network 140. In particular embodiments, links 150 illustrate interactions between mobile devices 120A, 120B, 120C and social-networking system 110. In particular embodiments, other links 150 illustrates interactions between mobile device 120D and mobile device 120A.

Mobile devices 120A, 120B, 120C, 120D are generally a computer or computing device including functionality for communicating over a computer network (e.g., remotely). Mobile devices 120A, 120B, 120C, 120D may be laptop or desktop computers, personal digital assistants (PDAs), in- or out-of-car navigation systems, smartphone or other cellular or mobile phones or mobile gaming devices, standalone mobile hotspots, MiFi devices, or personal travel routers, among other suitable mobile computing devices. Mobile devices 120A, 120B, 120C, 120D may execute one or more client applications, such as a web browser (e.g., MICROSOFT WINDOWS INTERNET EXPLORER, MOZILLA FIREFOX, APPLE SAFARI, GOOGLE CHROME, AND OPERA), to access and view content over a network. Herein, reference to a mobile device 120 may encompass a suitable non-mobile computing device, where appropriate.

Mobile devices 210A, 210B, 210C, 210D may all be in proximity to each other and each have radio equipment that enables them to communicate to each other through other links 160. Particular embodiments may utilize a variety of underlying or enabling network technologies and protocols, including but not limited to, IEEE 802.11, IEEE 802.16, Ethernet, Address Resolution Protocol (ARP), Reverse Address Resolution Protocol (RARP), INTERNATIONAL TELECOMMUNICATION UNION TELECOMMUNICATION STANDARDIZATION SECTOR (ITU-T) G.hn, High-Level Data Link Control (HDLC), BLUETOOTH, and the like. Note that only four mobile devices are illustrated in order to simplify the discussion. In practice, there may be tens, hundreds, or even thousands of mobile devices in proximity to each that may attempt to access the network through a first mobile device. Mobile devices 210A, 210B, 210C, 210D may be so-called dual-mode phones, as described later.

In particular embodiments, one or more links 150 and other links 160 each includes one or more wireline, wireless, or optical links. In particular embodiments, one or more links 150 and other links 160 each includes an intranet, an extranet, a VPN, a LAN, a WLAN, a WAN, a MAN, a portion of the Internet, or another link 150 or a combination of two or more such links 150 or other links 160. The present disclosure contemplates any suitable links 150 coupling mobile devices 120A, 120 B, 120C and social-networking system 110 to network 140. The present disclosure contemplates any suitable other links 160 coupling mobile device 120D to mobile device 120A.

Network 140 generally represents a network or collection of networks (such as the Internet or a corporate intranet, or a combination of both, or an ad hoc network) over which mobile devices 120 may access the social-networking system 110.

Social-networking system 110 may have a system front end, which may include web or HTTP server functionality, as well as other functionality, to allow users to access the social-networking system 110. Social-networking system 110 may have a presence server operative to monitor online presence of users and to provide presence information to one or more requesting clients, such as mobile devices 120. Social-networking system may have a privacy policy data base for maintaining user preferences with respect to user privacy. Social-networking system may have an authorization server that enforces the privacy preference of each user of the social-networking system 110. Social-networking system may have an authentication server that authenticates mobile devices 120A, 120B, 120C, 120D and the respective users to the social-networking system.

In particular embodiments, the social-networking system 110 may have a presence server that maintains data pertaining to user presence received by mobile devices 120A, 120B, 120C, 120D and social-networking system 110. In particular embodiments, when users of the social-networking system 110 access the social-networking system, the social-networking system may store data that the user is present in a presence server. In particular embodiments, a presence application on mobile device interacts with the presence server of the social-networking system 110. The presence server may pull presence information for all mobile devices that are accessing the network and logged into the social-networking system. In particular embodiments, the social-networking system 110 may continuously receive asynchronous messages at particular time intervals, such as every 30 s, 1 min, 5 min, and so on from the presence application executing on the mobile devices. In particular embodiments, the user may specify that they are "online."

In particular embodiments, the user may select preferences for whether their presence information is transmitted to or accessed by the social-networking system 110. In particular embodiments, one or more aspects of the user's presence or privacy settings may be stored locally on the mobile device 120 in order to obviate the need for remote access and the settings may be periodically synchronized with the presence server or a privacy controls database in the social-networking system 110. The presence application may also retrieve and display the presence information associated with the social network contacts of the user. In addition, information relating to the user's contacts may be stored locally on the user's mobile device.

In particular embodiments of a social-networking system 110, a privacy policy database may store a user's privacy data for a user's settings for each user datum associated with the user and the user's settings for third party applications. For example, a user may have selected default privacy settings or a user may have specifically excluded certain entities from viewing a user datum or particular type of user data, and all of that privacy data for all users and friends of users may be stored in the privacy policy database.

In particular embodiments, the privacy policy database may specify a set of entities that includes exceptions that are not allowed to access the user's information. In particular embodiments, for example, the user of the social-networking system may allow all external systems to access the user's work information but specify a list of external systems that are not allowed to access the work information. In particular embodiments, the list of exceptions that are not allowed to access certain information of the user may be a "block list." In particular embodiments, external systems belonging to a block list specified by a user of the social-networking system are blocked from accessing the information specified in the privacy setting stored in the privacy policy database. Particular embodiments contemplate various combinations of granularity of permitted access or denial of access depending on the type of user information and sets of entities with which information may be shared or accessed by the sets of entities, as specified by the user and stored in the privacy policy database.

In particular embodiments of a social-networking system 110, an authorization server may enforce the privacy settings of the users of the social-networking system. In particular embodiments, the privacy setting of a user determines how particular information associated with a user may be shared. In particular embodiments, as described above, the privacy policy database comprises the privacy data for a user's settings for each user datum associated with the user and the user's settings for third party applications. More specifically, the privacy data for a user's settings may specify particular information associated with a user and the entity or entities with whom the information may be shared. In particular embodiments, the entities with which information may be shared, may include users, third party applications, external websites, or any other entity that may potentially access the information. In particular embodiments, the information that may be shared by a user may comprise any aspect of the user profile, events, locations, media, activities, or the news feed associated with the user.

In particular embodiments of a social-networking system 110, an authentication server may authenticate mobile devices and users of the social-networking system prior to allowing social hotspot access through a mobile device. Particular embodiments of the authentication server may authenticate a user of mobile devices 120A, 120B, 120C and the mobile devices themselves. Particular embodiments may allow a user to login to the social networking system 110 through a third party website, at which time the authentication server may authenticate a user attempting to login to the social-networking system through the third party website.

Mobile devices may include so-called dual mode functionality including radio frequency (RF) and associated functionality allowing for wireless communication using different network protocols and networks. For example, some dual mode mobile devices allow for packet-based, wireless communications over a cellular network using cellular network protocols, and over wireless local area networks using so-called WIFI or IEEE 802.11 standards. The IEEE 802.11 standard supports both an infrastructure mode where wireless communications are coordinated by an access point and an ad hoc mode where wireless communications are coordinated by a designated peer node. Much of the IEEE 802.11 standard defines a common operation whether using ad hoc or infrastructure mode. The use of ad hoc mode only affects the protocols, so there is generally no impact on the Physical Layers (i.e., 802.11a and 802.11b). Within the Media Access Control (MAC) Layer, all of the carrier sensing and most of the frame types and corresponding usage are the same regardless of which mode is utilized. The absence of an access point, however, means that an ad hoc wireless LAN must take on more of the MAC Layer responsibilities.

Within the semantics of the open systems interconnection (OSI) network architecture, the Data Link Layer protocols respond to service request from the network layer and they perform their function by issuing service requests to the PHY Layer. In some networks, such as IEEE 802 local area networks, the Data Link Layer is described in more detail with MAC and Logical Link Control (LLC) sublayers. In general, the MAC Layer manages and maintains communications between 802.11 stations (radio cards and access points) by coordinating access to a shared radio channel and utilizing protocols that enhance communications over a wireless medium. Often viewed as the "brains" of the network, the 802.11 MAC Layer uses an 802.11 PHY Layer, such as 802.11b or 802.11a, to perform the tasks of carrier sensing, transmission, and receiving of 802.11 frames.

A Media Access Control address (MAC address) is a unique identifier assigned to network interfaces for communications on the physical network segment. MAC addresses are used for numerous network technologies and most IEEE 802 network technologies, including Ethernet and WLAN. MAC addresses are most often assigned by the manufacturer of a network interface card (NIC) and are stored in its hardware, the card's read-only memory, or some other firmware mechanism. If assigned by the manufacturer, a MAC address usually encodes the manufacturer's registered identification number and may be referred to as the burned-in address. MAC addresses are formed according to the rules of one of three numbering name spaces managed by the Institute of Electrical and Electronics Engineers (IEEE): MAC-48, Extended unique identifier (EUI)-48, and EUI-64.

With respect to infrastructure wireless LANs, primary 802.11 MAC functions consist of scanning, authentication, association, wireless encryption protocol (WEP), request-to-send and clear-to-send (RTS/CTS), power save mode, fragmentation, and the like. The 802.11 standard defines various frame types that stations (i.e., NICs and access points) use for communications, as well as managing and controlling the wireless link, such as management frames, control frames, and data frames. Every frame has a control field that depicts the 802.11 protocol version, frame type, and various indicators, such as whether WEP is on, power management is active, and so on. In addition, all frames contain MAC addresses of the source and destination station (and access point), a frame sequence number, frame body and frame check sequence (for error detection).

IEEE 802.11 frames carry protocols and data from higher layers within the frame body. A data frame, for example, could be carrying the HTML code from a web page (complete with TCP/IP headers) that the user is viewing or code associated with a social-networking system. Other frames that mobile devices use for management and control carry specific information regarding the wireless link in the frame body. With respect to an infrastructure based network, for example, a beacon's frame body contains the service set identifier (SSID), timestamp, and other pertinent information regarding the access point.

IEEE 802.11 management frames enable stations, such as mobile devices, to establish and maintain communications. Common 802.11 management frame subtypes consist of authentication frames, deauthentication frames, association request frames, association response frames, reassociation request frames, reassociation response frames, disassociation frames, beacon frames, probe request frames, and probe response frames. 802.11 control frames assist in the delivery of data frames between stations. The following are common 802.11 control frame subtypes: Request to Send (RTS) frame, Clear to Send (CTS) frame, and Acknowledgement (ACK) frame. Further, 802.11 defines a data frame type that carries packets from higher layers, such as web pages, printer control data, and the like, within the body of the frame.

Figure 2:
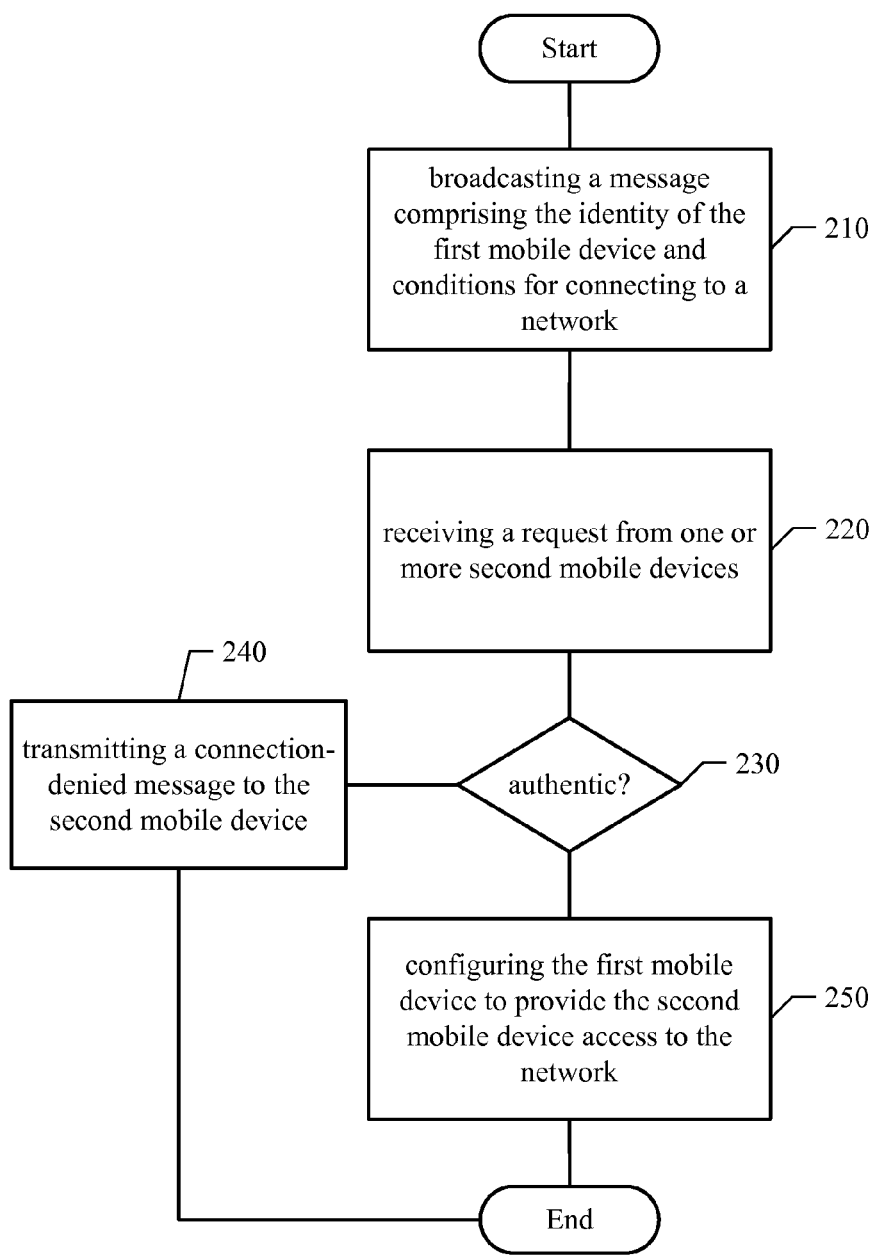
FIG. 2 illustrates an example method of neighbor discovery.

FIG. 2 illustrates an example method of establishing and utilizing a social hotpot. The method may start at step 210, where a first mobile device may broadcast a message having the identity of the first mobile device and conditions for connecting to a network through the first mobile device. At step 240 or 250, respectively, either the second mobile device may receive an access denied if the user of the second mobile device cannot be authenticated by the first mobile device, or in response to a second mobile device being authenticated, particular embodiments configure the first mobile device to provide network access to the second mobile device, at which point the method may end. Particular embodiments may repeat the steps of the method of FIG. 2, where appropriate. Moreover, although this disclosure describes and illustrates particular steps of the method of FIG. 2 as occurring in a particular order, this disclosure contemplates any suitable steps of the method of FIG. 2 occurring in any suitable order. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Particular embodiments of a social hotspot may be an application on a mobile device or as a part of a social-networking system application on the mobile device. Particular embodiments may provide a social hotspot that covers a public area with wireless signal. In particular embodiments, the social hotspot functionality is enabled on a mobile device and requires setup. Wireless access point functionality may be enabled. A name for the social hotspot, or the service set identifier (SSID), may be given a unique social hotspot name. The SSID may be a sequence of 2-32 octets each of which may take any value. This may be done either manually or automatically, based on a user's configuration of the social hotspot. In particular embodiments, the basic service set (BSS) comprises a single access point, or social hotspot, and all associated stations (STAs), or other mobile devices. The first mobile device acts as a master to control the other mobile devices within the BSS. The BSS identifier (BSSID) uniquely identifies the BSS, which may be the media access control (MAC) address of the mobile device.

In particular embodiments, the first mobile device may broadcast on a particular channel. In particular embodiments, for example, the user may select a channel on which to broadcast. For example, 802.11 uses radio frequencies in the range of 2412-2484 MHz and splits the available frequencies into 14 network channels, whereas BLUETOOTH uses short wavelength radio transmissions in the Industrial, Scientific, Medical (ISM) band from 2400-2480 MHz. The broadcasts, in 802.11 for example, may utilize a security algorithm, such as wired equivalent privacy (WEP), WI-FI protected access (WPA), or other security algorithm to encrypt the broadcast messages.

Particular embodiments may broadcast, from a first mobile device, a message having the identity of the first mobile device and conditions for connecting to a network through the first mobile device, as illustrated in step 210. In particular embodiments, the mobile device may periodically broadcast to other mobile devices in the vicinity that the first mobile device may be accessed as a social hotspot. The mobile device may be set to broadcast the SSID or to turn SSID broadcast off. The broadcast message may include the identity of a user of the first device, the identity of the first mobile device itself, and conditions for connecting to a network through the first mobile device.

In particular embodiments, the mobile devices 120A, 120B, 120C may append information elements, such as a user identifier, to the broadcast message. A user identifier may comprise a userID or other information (e.g., a uniform resource locator, etc.) associated with a user account for a user of a social-networking system. In particular embodiments, the userID and other information associated with the social-networking system may be encrypted. In particular embodiments, the social network information may be encrypted using asymmetric encryption (e.g., Public-Private key encryption). In particular embodiments, for example, each mobile device 120A, 120B, 120C, 120D may obtain an encrypted version of the user identifier corresponding to the respective user, where the encrypted version was encrypted by the social-networking system using a private key of the social-networking system. In this manner, only other users of the social-networking system (who obtain the public key) may decrypt the user-identifying information and utilize the user identifier. In particular embodiments, the user-identifying information may be encrypted using a symmetric key algorithm, where the encryption key is a function of the user identifier of the user. A mobile device that receives encrypted user-identifying information would apply a key generation function to generate keys for all users in a locally stored list, such as a list of user identifiers in a local contacts database. If the decrypted user identifying information matches a user identifier stored in the local contacts database, a match is declared. In this manner, only social contacts of a given user may resolve the user-identifying information with relative ease, as opposed to trying all possible combinations of user identifiers to decrypt the information.

Conditions for connecting may be login requirements, security requirements, restrictions on content access once networking access has been provided, and charges associated with the first mobile device providing the connection. The charges may be collected by the user of the first mobile device, the social-networking system, or a wireless carrier of the first mobile device, or other entity participating in the social hotspot environment. In particular embodiments, extending these messages allows mobile device 120A to associate an IP and/or MAC addresses of the mobile devices 120D with respective user identifiers.

In particular embodiments, the first mobile device may receive a request from one or more second mobile devices, as illustrated in step 220. If the second mobile device is within range of the first mobile device, it can select the first mobile device through which it may access the network. In particular embodiments, a social hotspot may present a captive portal to the second mobile device, the social hotspot may act as a social proxy server, or the social hotspot may comprise a non-mobile device and allow network access to mobile devices without presenting a captive portal or acting as a social proxy server.

In particular embodiments, the social hotspot may present a captive portal to the second mobile device that is attempting to access the network through the first mobile device. A captive portal forces an HTTP client on a network to see a special web page (usually for authentication purposes) before allowing the HTTP client to access the network normally. A captive portal turns a web browser on the first mobile device into an authentication device. This is done by intercepting all packets regardless of address or port, until the user opens a browser and tries to access the internet. At that time, the browser is redirected to a web page that may require authentication and payment, or simply display an acceptable use police and require the user to agree. Captive portals are used at most WI-FI hotspots and it can be used to control social hotpot or wired access as well. In particular embodiments, a captive portal may use RADIUS or DIAMETER, or an HTTP protocol for access provisioning and accounting.

In particular embodiments, the portal, or social hotspot identifies clients by their IP and MAC addresses and requires that the user's web browser have an authenticator, that is, an encrypted message generated by the authentication server and that periodically has to be renewed and set to the gateway. In particular embodiments, the authenticator may be encrypted using standard encryption algorithms and cannot easily be counterfeited before it expires.

There are a variety of ways to implement a captive portal, such as by redirection by HTTP, an IP redirect, or redirection by Domain Name System (DNS). In redirection by HTTP, if an unauthenticated client requests a website, DNS is queried by the browser and the appropriate IP resolved as usual. The browser then sends an HTTP request to that IP address. This request, however, is intercepted by a firewall and forward to a redirect server. This redirect server responds with a regular HTTP response that contains HTTP status code 302 to redirect the client to the captive portal. To the client, this process is totally transparent. The client assumes that the website actually responded to the initial request and sent the redirect. In an IP redirect, client traffic may also be redirected using IP redirect on the layer 3 level. This has the disadvantage that content served to the client does not match the URL. In redirection by DNS, when a client requests a website, DNS is queried by the browser. The firewall will make sure that only the DNS server(s) provided by DHCP may be used by unauthenticated clients (or alternatively, it will forward all DNS requests by unauthenticated clients to that DNS server). The DNS server will return the IP address of the captive portal page as a result of all DNS lookups.

Figure 3:
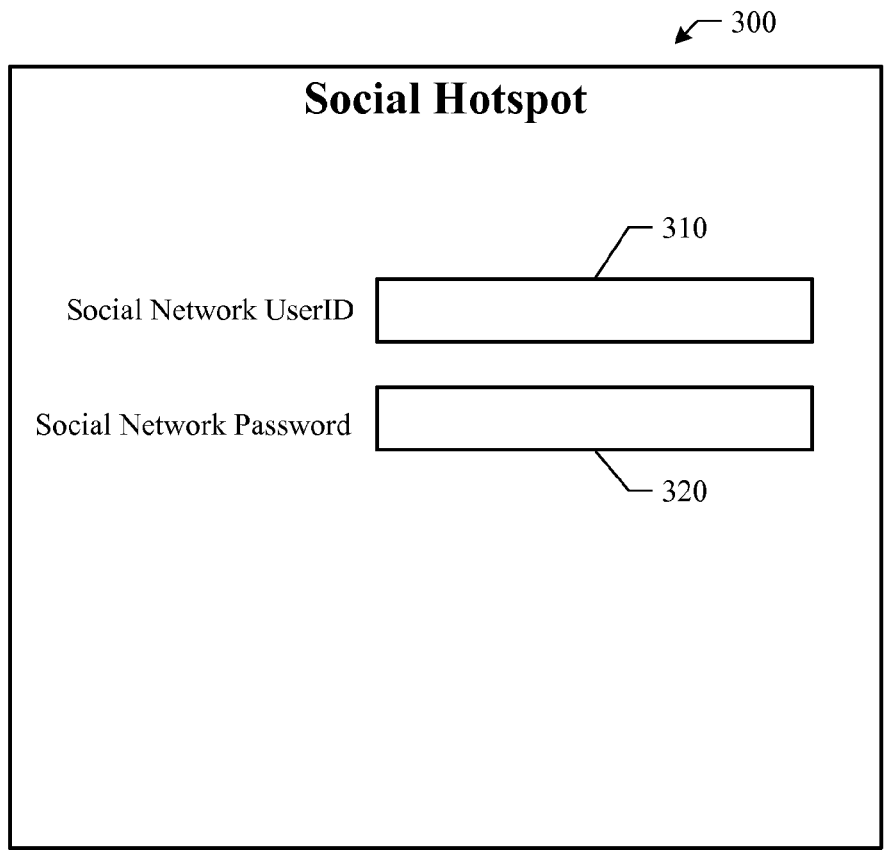
FIG. 3 illustrates an example login display.

FIG. 3 illustrates an example login page 300 that may be displayed when a user of a second mobile device attempts to access the network through the first mobile device. Particular embodiments require users to pass an SSL encrypted login page, after which their IP and MAC address are allowed to pass through the gateway. Captive portals may require the use of a browser, which is usually the first application that a user starts, but users that first use an email client or other application will find the connection not working without explanation and will need to open a browser to validate. In particular embodiments, any non-web-traffic, such as SMTP for email, or FTP, may be blocked using a firewall of some type, but may be caught and redirected by a particularly sophisticated captive portal as well. In particular embodiments, the login page itself must be presented to the second mobile device. The login page may be either stored locally in the first mobile device or in the social-networking system 110. In particular embodiments, the first mobile device may locally store UserIDs of friends of the first user in the social-networking system. In particular embodiments, the first mobile device may locally store UserIDs of users of the social-networking system that have liked a page associated with the first mobile device or a user of the first mobile device. The first mobile device may also locally store the UserIDs for second users of second mobile devices that have previously logged into the network through the first mobile device.

In particular embodiments, the social hotspot may act as a social proxy server. A proxy server is a server (computer system or application) that acts as an intermediary for requests from clients seeking resources from other servers. A client may connect to the proxy server, requesting some service, such as a file, connection, web page, or other resource, available from a different server. The proxy server evaluates the request according to its filtering rules. For example, it may filter traffic by IP address or protocol. If the request is validated by the filter, the proxy provides the resource by connecting to the relevant server and requesting the service on behalf of the client. A proxy server may optionally alter the mobile device's request or the server's response, and sometimes it may serve the request without contacting the specified server. In this case, it "caches" responses from the remote server, and returns subsequent requests for the same content directly. Most proxies are a web proxy, allowing access to content on the internet. An intercepting proxy, also known as a forced proxy or transparent proxy, is a proxy that intercepts normal communication, without clients needing any special configuration to use the proxy. Clients do not need to be aware of the existence of the proxy. A transparent proxy is a proxy that does not modify the request or response beyond what is required for proxy authentication and identification. A non-transparent proxy is a proxy that modifies the request or response in order to provide some added service to the user agent, such as group annotation services, media type transformation, protocol reduction, or anonymity filtering.

In particular embodiments, the social hotspot may reside on a non-mobile device 120A and allow user of second mobile devices 120B, 120C, 120D to access the network without providing a captive portal or acting as a social proxy server. In particular embodiments, userIDs of users of mobile devices 120B, 120C, and 120D that have liked or checked into a particular location associated with the social hotspot within the social-networking system may be locally stored at the first non-mobile device 120A. In particular embodiments, for example, a social hotspot, such as a coffee shop, may allow users of mobile devices to access the network if they like the coffee shop or check-in at the coffee shop within the social-networking system. In this manner, users of second mobile devices 120B, 120C, and 120D may choose to like or check-in at the coffee shop in order to gain network access.

Particular embodiments may authenticate one or more second mobile devices with the social-networking system, as illustrated in step 230. Particular embodiments of the social hotspot may authorize, authenticate, and retain an accounting of second mobile devices that access the network through the first mobile device. Authorization refers to the process where an entity's identity is authenticated, typically by providing evidence that it holds a specific digital identity such as an identifier and the corresponding credentials. Examples of types of credentials include, but are not limited to, passwords, one-time tokens, digital certificates, and phone numbers. Authorization determines whether a particular entity is authorized to perform a given activity, typically inherited from authentication when logging on to an application or service. Authorization may be determined based on a range of restrictions, for example, time of day restrictions, or physical location restrictions, or restrictions against multiple access by the same entity or user. Examples of types of service include, but are not limited to, IP-address filtering, address assignment, route assignment, quality of services/differential services, bandwidth control/traffic management, compulsory tunneling to a specific endpoint, and encryption.

In particular embodiments, the social-networking system may authenticate mobile device 120A and mobile device 120D. In particular embodiments, authorization or authentication may be performed on the back-end by one or more servers or databases associated with the social-networking system. Users of the second mobile devices may be required to enter a user name in field 310 and a password in field 320, as illustrated in FIG. 3. In particular embodiments, the social-networking system may be utilized to authenticate mobile devices 120D with the social-networking system and as to mobile device 120A. This ensures that the user of mobile device 120D is who they say they are. It also may allow either mobile device 120A to access user information for the user of mobile device 120D and vice versa.

In particular embodiments, authorization or authentication may be performed at the first mobile device 120A or first non-mobile device 120A. Users of the first mobile or non-mobile device and second mobile devices may be required to login to the social-networking system in order to authenticate each user's identity. Authorization or authentication may be performed by the first mobile or non-mobile device 120A by comparing the UserID of the user of the second mobile device 120D with UserIDs locally stored at the first mobile device. In this manner, authorization and authentication may be simplified if a second user of a second mobile device 120D is a friend of the user of the first mobile device 120A, has previously connected to the network through the first mobile device 120A, or has liked a page associated with the first mobile device 120A. In particular embodiments, authorization or authentication may be performed in this manner at the first mobile or non-mobile device 120A without the use of a captive portal or proxy server.

In particular embodiments, the second mobile device may receive an access denied message if the user of the second mobile device cannot be authenticated by the first mobile device or the social-networking system, as illustrated in step 240. In response to a second mobile device being authenticated, particular embodiments configure the first mobile device to provide network access to the second mobile device, as illustrated in step 250. In particular embodiments, once the user of the second mobile device signs in and pays up, the social hotspot stops interfering with its traffic and reverts to a "pass-through" mode on the first mobile device. In particular embodiments, after authentication, a pop-up window may appear to the user to guarantee the renewing of the authenticator and to allow him to force a disconnection request by clicking a button or other clickable object. In particular embodiments, where the second mobile device attempts to connect to the network through the first mobile device the social hotspot may check the user's identity (usually by looking at the mobile device's relevant MAC address), and silently lets the mobile through if it is still within the time-window of service.

In particular embodiments, when a second mobile device accesses the network through the first mobile device, users of the second device may be limited in scope of what kind of content may be accessed based on the conditions set forth by the first mobile device. In particular embodiments, for example, the second user may be able to check emails or access a social-networking system, such as Facebook®, but not access videos on other websites, such as Hulu.com® or YouTube®. In particular embodiments, access for friends of the first user within the social-networking system may be granted limited access or permitted unlimited access.

Particular embodiments may log charges associated with network usage of the second mobile device and assess charges to the user of the second mobile device as well as credits to the first mobile device or carrier system, such as a wireless carrier. Accounting refers to the logging of network resource consumption by users for the purpose of capacity and trend analysis, cost allocation, and billing. In addition, it may record events such as authentication and authorization failures, and include auditing functionality, which permits verifying the correctness of procedures carried out based on accounting data. Real-time accounting refers to accounting information that is delivered concurrently with the consumption of the resources. Batch accounting refers to accounting information that is saved until it is delivered at a later time. Typical information that is gathered in accounting is the identity of the user or other entity, the nature of the service delivered, when the service began, when it ended, and if there is a status to report.

In particular embodiments, accounting is managed and the social hotspot knows the duration and traffic of the user's connection. In particular embodiments, the social-networking system logs usage, payments, and knows who is a paid-up customer and who is not.

Figure 4:
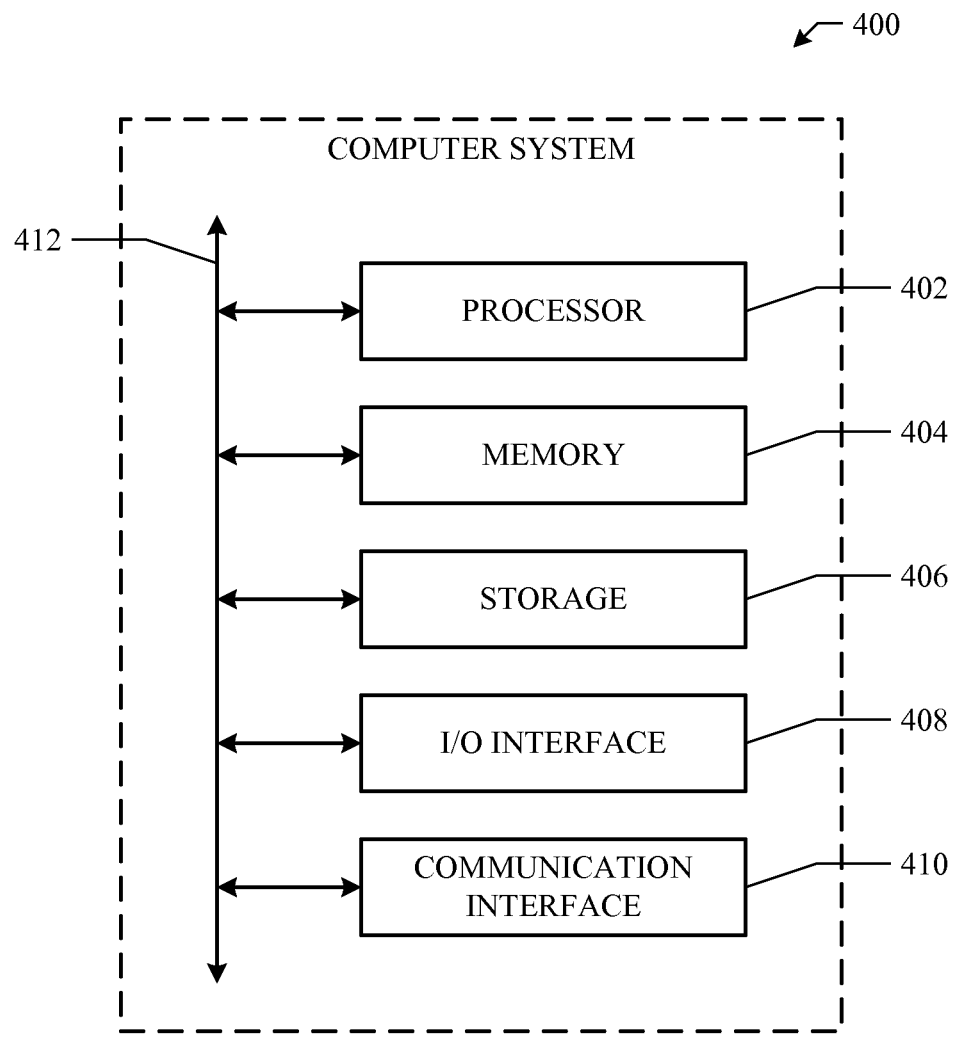
FIG. 4 illustrates an example computer system.

Particular embodiments may be implemented on one or more computer systems. FIG. 4 illustrates an example computer system 400 that may be used to implement a host, such as a server, client desktop computer or mobile device that executes the functionality described above. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductorbased or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy disks, floppy disk drives (FDDs), magnetic tapes, holographic storage media, solid-state drives (SSDs), RAM-drives, SECURE DIGITAL cards or drives, or other suitable computer-readable non-transitory storage media or a suitable combination of these, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    broadcasting, by a first computing device of a first user, a message comprising a first-user identifier corresponding to a respective first-user account of the first user in a social-networking system and conditions for connecting to a network through the first computing device;
    receiving, by the first computing device, a request from one or more second computing devices of one or more respective second users that each comprise a second-user identifier corresponding to a respective second-user account of the respective second user in the social-networking system;
    determining, by the first computing device, whether one or more of the second computing devices are authorized to access the network through the first computing device; and
    if the one or more of the second computing devices are authorized to access the network through the first computing device, then, by the first computing device, configuring the first computing device to provide network access to the second computing devices that are authorized to access the network.

2. The method of claim 1, wherein determining whether the second computing devices are authorized comprises, for each of one or more of the second computing devices:
    sending, by the first computing device, the first-user identifier and the respective second-user identifier to the social-networking system to authenticate the first computing device and the second computing device with the social-networking system; and
    receiving, by the first computing device, authorization from the social-networking system for the first computing device to access user information of the respective second user and for the second computing device to access the network through the first computing device.

3. The method of claim 1, wherein:
    the first computing device is:
        a mobile computing device; or
        a non-mobile computing device; and
    one or more of the second computing devices are:
        mobile computing devices; or
        non-mobile computing devices.

4. The method of claim 1, wherein determining whether the second computing devices are authorized to access the network through the first computing device comprises determining, for each of one or more of the second computing devices, whether the respective second user has an association with the first user in the social-networking system.

5. The method of claim 4, wherein the respective second user has an association with the first user in the social-networking system if the respective second user has, in the social-networking system liked or checked into a location associated with the first user.

6. The method of claim 1, further comprising:
    storing, on the first computing device, one or more user identifiers for users that are within a predetermined number of degrees of separation of the first user, wherein each of the user identifiers corresponds to respective user accounts of the users in the social-networking system, wherein the respective second user has an association with the first user in the social-networking system if the respective second-user identifier is one of the user identifiers stored on the first computing device.

7. The method of claim 1, wherein the broadcast first-user identifier and conditions are encrypted and may be decrypted by a key obtained from the social-networking system.

8. The method of claim 1, wherein the second-user identifiers were encrypted using a private key of the social-networking system.

9. The method of claim 8, wherein determining, by the first computing device, whether one or more of the second computing devices are authorized to access the network through the first computing device comprises decrypting the encrypted second-user identifiers using a public key of the social-networking system.

10. The method of claim 1, wherein the second-user identifiers were encrypted using a symmetric key algorithm.

11. The method of claim 10, wherein determining, by the first computing device, whether one or more of the second computing devices are authorized to access the network through the first computing device comprises:
    generating keys for one or more user identifiers in a locally stored list; and
    comparing the encrypted second-user identifiers to the generated keys.

12. The method of claim 1, wherein:
    the message further comprises a login page; and
    one or more of the requests is received at least in part in response to one or more of the second users entering the respective second-user identifier via the login page.

13. The method of claim 12, wherein:
    the login page is stored on the first computing device; or
    the login page is stored on the social-networking system.

14. The method of claim 1, further comprising storing on the first computing device identifiers of users of the social-networking system, wherein the stored identifiers are associated with one or more of:
    one or more of the users of the social-networking system who are friends on the social-networking system with the first user;

one or more of the users of the social-networking system who like a page on the social-networking system associated with the first mobile device or the first user; or one or more of the users of the social networking-system who are associated with second devices that have been authorized to access the network through the first computing device;

wherein determining, by the first computing device, whether one or more of the second computing devices are authorized to access the network through the first computing device comprises comparing one or more of the received second-user identifiers to the stored identifiers.

15. The method of claim 1, wherein the network access provided to the second computing devices comprises one or more types of network access, wherein the types of network access are dependent at least in part a type of association between the first user and the respective second user in the social-networking system.

16. A first computing device comprising:
one or more processors; and
a memory coupled to the processors comprising instructions executable by the processors, the processors being operable when executing the instructions to:
broadcast a message comprising a first-user identifier corresponding to a respective first-user account of a first user of the first computing device in a social-networking system and conditions for connecting to a network through the first computing device;
receive a request from one or more second computing devices of one or more respective second users that each comprise a second-user identifier corresponding to a respective second-user account of the respective second user in the social-networking system;
determine whether one or more of the second computing devices are authorized to access the network through the first computing device; and
if the one or more of the second computing devices are authorized to access the network through the first computing device, then configure the first computing device to provide network access to the second computing devices that are authorized to access the network.

17. The first computing device of claim 16, wherein determining whether the second computing devices are authorized comprises, for each of one or more of the second computing devices:
sending the first-user identifier and the respective second-user identifier to the social-networking system to authenticate the first computing device and the second computing device with the social-networking system; and
receiving authorization from the social-networking system for the first computing device to access user information of the respective second user and for the second computing device to access the network through the first computing device.

18. The first computing device of claim 16, wherein:
the first computing device is:
a mobile computing device; or
a non-mobile computing device; and
one or more of the second computing devices are:
mobile computing devices; or
non-mobile computing devices.

19. The first computing device of claim 16, wherein determining whether the second computing devices are authorized to access the network through the first computing device comprises determining, for each of one or more of the second computing devices, whether the respective second user has an association with the first user in the social-networking system.

20. The first computing device of claim 19, wherein the respective second user has an association with the first user in the social-networking system if the respective second user has, in the social-networking system liked or checked into a location associated with the first user.

21. The first computing device of claim 16, wherein the processors are further operable when executing the instructions to:
store, on the first computing device, one or more user identifiers for users that are within a predetermined number of degrees of separation of the first user, wherein each of the user identifiers corresponds to respective user accounts of the users in the social-networking system, wherein the respective second user has an association with the first user in the social-networking system if the respective second-user identifier is one of the user identifiers stored on the first computing device.

22. The first computing device of claim 16, wherein the broadcast first-user identifier and conditions are encrypted and may be decrypted by a key obtained from the social-networking system.

23. One or more computer-readable non-transitory storage media embodying software that is operable when executed by a first computing device to:
broadcast a message comprising a first-user identifier corresponding to a respective first-user account of a first user of the first computing device in a social-networking system and conditions for connecting to a network through the first computing device;
receive a request from one or more second computing devices of one or more respective second users that each comprise a second-user identifier corresponding to a respective second-user account of the respective second user in the social-networking system;
determine whether one or more of the second computing devices are authorized to access the network through the first computing device; and
if the one or more of the second computing devices are authorized to access the network through the first computing device, then configure the first computing device to provide network access to the second computing devices that are authorized to access the network.

24. The media of claim 23, wherein determining whether the second computing devices are authorized comprises, for each of one or more of the second computing devices:
sending the first-user identifier and the respective second-user identifier to the social-networking system to authenticate the first computing device and the second computing device with the social-networking system; and
receiving authorization from the social-networking system for the first computing device to access user information of the respective second user and for the second computing device to access the network through the first computing device.

25. The media of claim 23, wherein:
the first computing device is:
a mobile computing device; or
a non-mobile computing device; and
one or more of the second computing devices are:
mobile computing devices; or
non-mobile computing devices.

26. The media of claim 23, wherein determining whether the second computing devices are authorized to access the network through the first computing device comprises determining, for each of one or more of the second computing devices, whether the respective second user has an association with the first user in the social-networking system.

27. The media of claim 23, wherein the respective second user has an association with the first user in the social-networking system if the respective second user has, in the social-networking system liked or checked into a location associated with the first user.

28. The media of claim 23, wherein the software is further operable when executed to:
    store, on the first computing device, one or more user identifiers for users that are within a predetermined number of degrees of separation of the first user, wherein each of the user identifiers corresponds to respective user accounts of the users in the social-networking system, wherein the respective second user has an association with the first user in the social-networking system if the respective second-user identifier is one of the user identifiers stored on the first computing device.

\* \* \* \* \*